United States Patent [19]

Mollier

[11] 4,238,182
[45] Dec. 9, 1980

[54] DEVICE FOR INJECTING PLASTICS MATERIAL INTO A MOULD HAVING A PLURALITY OF IMPRESSIONS

[76] Inventor: Gilbert Mollier, La Balmette, 74210 Faverges, France

[21] Appl. No.: 927,300

[22] Filed: Jul. 24, 1978

[30] Foreign Application Priority Data

Aug. 3, 1977 [FR] France ............................ 77 23883

[51] Int. Cl.³ .......................... B29F 1/03; B29F 1/05
[52] U.S. Cl. ................................ 425/566; 425/549; 425/570; 425/DIG. 229
[58] Field of Search ............... 425/549, 564, 568–571, 425/566, DIG. 229; 251/367, 368, 84, 86

[56] References Cited

U.S. PATENT DOCUMENTS

| Re. 28,144 | 9/1974 | Goron | 425/564 X |
| 3,271,491 | 9/1966 | Mikkelborg | 425/568 |
| 3,719,310 | 3/1973 | Hunter | 425/564 X |
| 3,915,610 | 10/1975 | Kohler | 425/568 |
| 4,013,393 | 3/1977 | Gillert | 425/571 X |

FOREIGN PATENT DOCUMENTS 40-3545 2/1965 Japan ...................... 425/568
40-3546 2/1965 Japan ...................... 425/568

*Primary Examiner*—Thomas P. Pavelko
*Attorney, Agent, or Firm*—J. Harold Nissen

[57] ABSTRACT

This device injects plastics material into a mould having a plurality of impressions. It comprises a distribution plate pierced with channels for the inlet of the plastics material to be injected and provided with heating means and an impression plate comprising a plurality of impression inserts into which the plastics material is to be injected. Injection nozzles are disposed between the distribution plate and the various impression inserts, each presenting an injection orifice opening into the impression insert associated therewith and being obturated by an obturator needle mounted to slide axially in the nozzle. The connection between the distribution plate and each nozzle is ensured by a material transfer tube engaged in two cavities made respectively in the distribution plate and the nozzle, opposite each other, the first communicating with a channel for the inlet of the plastics material and the second with the injection orifice of the nozzle, this transfer tube being in tight contact with the lateral walls of the two cavities via two respective spherical sectors provided on its side surface.

7 Claims, 1 Drawing Figure

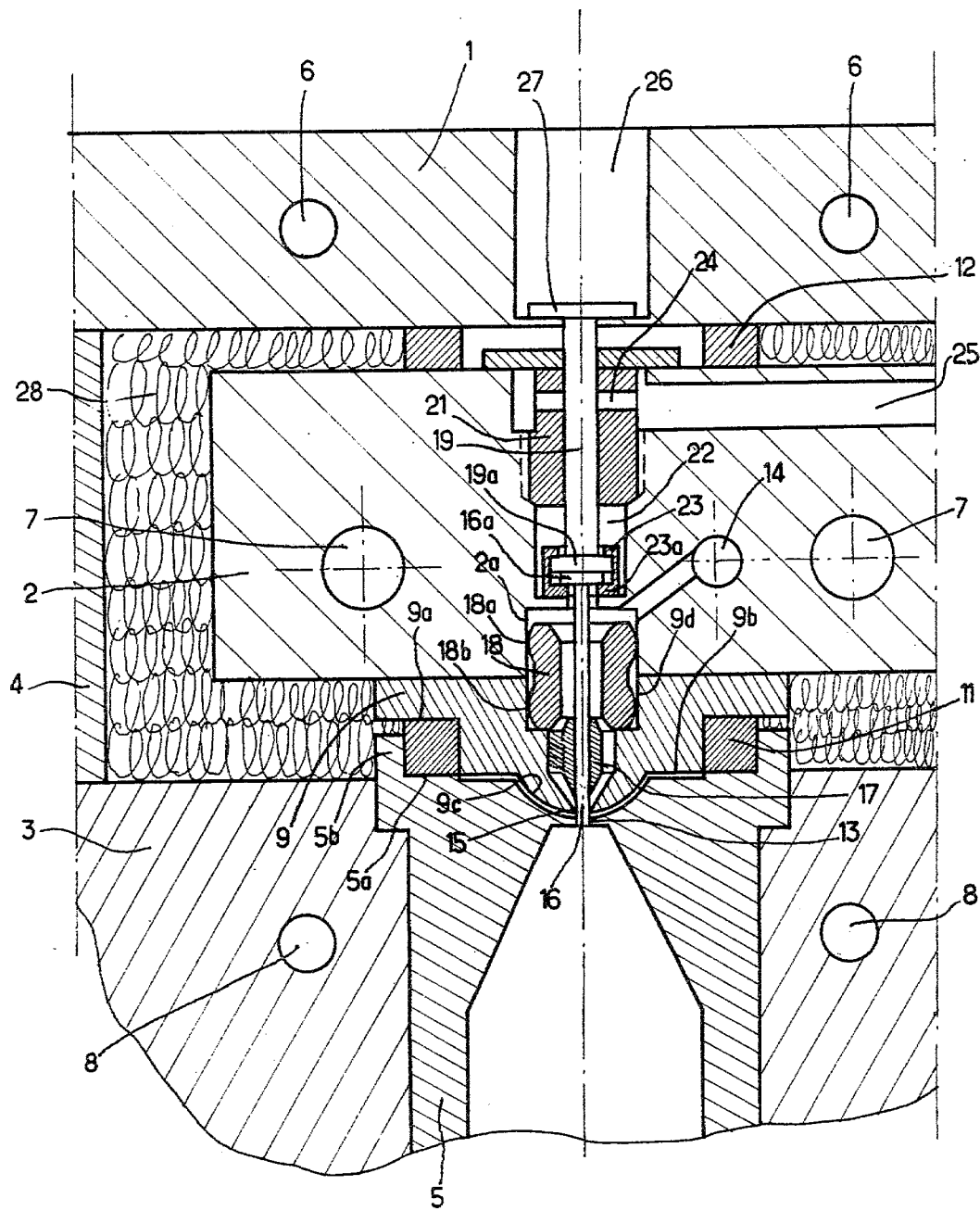

DEVICE FOR INJECTING PLASTICS MATERIAL INTO A MOULD HAVING A PLURALITY OF IMPRESSIONS

BACKGROUND OF THE INVENTION

The present invention relates to improvements in devices injecting plastics material in a mould having a plurality of impressions.

Injection moulding machines are already known which generally comprise a distribution plate pierced with channels for the inlet of the molten plastics material and provided with heating means to maintain this plate at a relatively high temperature, of the order of 200° C. The plastics inlet channels communicate with the injection nozzles which are respectively associated with the individual moulds in which the injection is to take place and which each comprise an impression insert housed in an impression plate provided with a cooling circuit, to maintain it at a temperature much lower than the distribution plate, of the order of 40° C. In each injection nozzle is slidably mounted a needle forming obturator, normally obturating an injection orifice provided at the end of the nozzle and through which the plastics material may be injected into each mould.

In the heretofore known injection moulding machines, the distribution plate bearing the injection nozzles and the impression plate are assembled together with considerable mechanical forces, obtained by means of set screws, being given the very high pressure of injection employed. Now, these high mechanical forces are incompatible with the expansions or contractions which appear in the course of production due to the permanent contact of the hot distribution plate with the cold assembly constituted by the impression plate. The tightness obtained under these conditions is particularly doubtful and furthermore the corrections of the axial alignments are obtained by providing a longer length of the constituent elements, this therefore allowing a certain flexion thereof.

Consequently, the central obturator provided in each injection nozzle is never in line with the injection orifice, hence its destruction with loss of appearance of the injection threshold on the moulded piece.

The above construction also leads to very considerable dimensions of the mould.

SUMMARY OF THE INVENTION

It is an object of the present invention to remedy these drawbacks by providing a device of particularly simple design, ensuring a perfect tightness in the course of production.

To this end, this device for injecting plastics material into a mould having a plurality of impressions, comprising a distribution plate pierced with channels for the inlet of the plastics material to be injected and provided with heating means, an impression plate comprising a plurality of impression inserts into which the plastics material is to be injected, injection nozzles disposed between the distribution plate and the various impression inserts, each presenting an injection orifice opening into the impression insert associated therewith and being obturated by an obturator needle mounted to slide axially in the nozzle, is characterised in that the connection between the distribution plate and each nozzle is ensured by a material transfer tube engaged in two cavities made respectively in the distribution plate and the nozzle, opposite each other, the first communicating with a channel for the inlet of the plastics material and the second with the injection orifice of the nozzle, this transfer tube being in tight contact with the lateral walls of the two cavities via two respective spherical sectors provided on its side surface.

The material transfer tube is thus inserted with slight diametrical tightening between the two pieces in contact constituted by the distribution plate and each nozzle, these two pieces not being connected to each other positively. It allows the passage of the plastics material from distribution plate to the inside of each injection nozzle, whilst allowing a slight relative displacement of the distribution plate of each nozzle, this displacement being radial, rotary or planetary.

According to a further feature of the invention, the injection device comprises, for each nozzle, an obturator constituted by two coaxial cylindrical pieces, namely an obturator needle sliding in the nozzle, projecting in a coaxial housing provided in the distribution plate, and a coaxial rod placed in this housing and extending the needle outwardly of the distribution plate, the obturator needle and the rod being in contact with each other via two respective heads of different diameters and assembled together by a ring crimped on the head of large diameter leaving a minimum axial clearance for the head of smaller diameter but allowing it the radial, rotary or planetary displacements necessary for its alignment.

The injection device according to the invention offers the advantage that it makes it possible to obtain a total seal under high pressure and a positive obturation, in the course of transfer of a plastics material from the distribution plate to the cold assembly constituted by the impression plate, the distribution plate and the injection nozzles not being positively connected and being able to move radially with respect to one another by a small amount as a function of the expansions and contractions produced by the variations in temperature.

The obturation of the injection threshold is effected by means of a guided needle, this preventing any ovalisation of the injection orifice which may provoke an alteration in the injected piece.

In view of the floating connection established between the hot distribution plate and the various injection nozzles, due to the use of material transfer tubes, the obturator needle of each nozzle is not subjected to any flexion since it may very easily follow the relative radial displacement of the nozzle with respect to the distribution plate.

The injection device according to the invention does not cause any clogging of the injection thresholds and it ensures a perfect flow of the plastics material to the center of the elements.

The return of the obturator needle is controlled by means of a coaxial sliding rod, guided in a ring and at this level there exist slight residual leakages which constitute an advantageous factor as they bring about the interposition of a microfilm of plastics material acting as lubricant. These residual leakages are advantageously canalized and evacuated to outside the mould.

The device according to the invention also offers the advantage of having a high heat yield due to the use of electric heating cartridges or the circulation of a heat-carrying fluid. To this end, the hot distribution plate is wedged in space by means of shims made of a material with poor heat conductivity, for example a titanium alloy. In addition, to avoid supplementary losses by radiation or ventilation, this distribution plate is completely insulated by a heat insulator such as glass wool.

The high thermal yield obtained with the injection device according to the invention, associated with the total elimination of the parasitic mechanical stresses, ensures a high reliability of production, with a reduction in cost price.

Another advantage offered by the device according to the invention is the saving in construction obtained with very short constituent elements, this consequently bringing about a reduction in the thickness of the moulds, therefore easier handling thereof and allowing them to be assembled on injection presses with a smaller passage between plates.

BRIEF DESCRIPTION OF THE DRAWINGS

The invention will be more readily understood on reading the following description with reference to the accompanying drawings, in which:

The single figure is a view in axial section of device for injecting plastics material in a mould having a plurality of impressions.

DESCRIPTION OF THE PREFERRED EMBODIMENT

Referring now to the drawings, the device for injecting plastics material essentially comprises an upper plate 1, an intermediate distribution plate 2 and a lower impression plate 3, which are maintained in assembled relationship by means of an outer frame 4. The impression plate 3 comprises a plurality of added pieces 5 constituting impression inserts and in which are injected pieces of plastics material moulded in the course of one and the same operation.

The plate 1 is pierced with conduits 6 constituting a cooling circuit ensuring that the temperature of this plate is maintained at about 40° C. The distribution plate 2 is also pierced with conduits 7 in which electrical heating cartridges may be inserted or which serve for the circulation of a heat-carrying fluid. The distribution plate 2 is thus maintained at a relatively high temperature, of the order of 200° C. for example, to maintain the injected plastics material in the molten state. Finally, the impression plate 3 is also pierced with conduits 8 constituting a cooling circuit to maintain this plate at a relatively low temperature of the order of 40° C.

Between the distribution plate 2 and the impression plate 3 are disposed a plurality of injection nozzles 9, of which only one has been shown in the drawing. Each nozzle is naturally disposed opposite an impression insert 5, in order to inject the fluid plastics material therein. Each nozzle 9 is positively connected to the distribution plate 2 but it is simply applied and tightened thereon, via a shim 11 made of a material which is a poor heat conductor, for example titanium alloy. This shim 11 is interposed between a lower shoulder 9a of the nozzle 9 and the upper front face 5a of the impression insert 5 which is bordered by an upwardly projecting flange 5b serving to maintain the annular shim 11 laterally.

Another shim 12, made of titanium alloy for example, is interposed between the upper face of the distribution plate 2 and the lower face of the plate 1. The assembly constituted by this plate 1, the distribution plate 2, the impression plate 3, the nozzles 9 and the separating shims 11, 12 is maintained firmly tightened by means of the outer frame 4. Consequently, there is no mechanical stress at the level of assembly of the hot distribution plate 2 and the injection nozzles 9. Thus, a good slide is obtained of the upper face of the nozzles 9 against the lower face of the distribution plate 2.

As may be seen in the drawing, each injection nozzle 9 has a lower front face 9b of large surface, with a central convex portion 9c, which engages in a corresponding hollow portion provided in the upper part of the impression insert 5. The nozzle 9 is thus fitted in the impression insert 5 with a large bearing surface, this enabling the maximum of calories to be transmitted from the distribution plate 2 to the injection: threshold 13 distant for example by 25 mm. Thus, at this threshold, a temperature of 125° C. is obtained and the distribution plate is taken to 200° C.

The assembly which has just been described is consequently of little height, which allows a very compact construction of the moulds and the low ratio between the height and the diameter of each nozzle 9 prevents any tipping thereof.

In the upper face of each nozzle 9, which is in contact with the lower face of the distribution plate 2, there is made a cavity 9d which opens in this upper face, opposite a cavity 2a made in the distribution plate 2 and opening in the lower face of this latter. The cavity 2a of the distribution plate 2 communicates with a conduit 14 for the inlet of the molten plastics material.

The cavity 9d of the nozzle 9 communicates with the injection orifice 15 provided in the lower part of the nozzle 9, at the centre of the convex part 9c. This injection orifice 15 is obturated by a needle 16 sliding axially and guided, at the centre of the nozzle 9, by a guide 17 through which passes said needle 16. In position of closure, the lower end part of the needle 16 slightly projects from the nozzle 9 and is engaged in the injection threshold 13.

A material transfer tube 18, partially engaged both in the cavities 2a of the distribution plate 2 and 9d of the nozzle 9, is provided to ensure a total seal under high pressure between the plate 2 and the nozzle 9 not positively connected and being able to move radially with respect to each other by a small amount, according to the variations in temperature. This transfer tube 18 presents on its lateral surface, at its two ends, two annular swells in the form of spherical sectors 18a, 18b inserted respectively, with slight diametrical tightening, in the cavities 2a and 9d. The inner passage of the tube 18 thus establishes a communication between the channel 14 for the inlet of molten plastics material and the injection orifice 15. The tube 18 allows the passage of the molten plastics material under high pressure, whilst allowing a slight radial, rotary or planetary displacement of the distribution plate 2 with respect to the injection nozzle 9.

The assembly of the obturator ensuring the closure of the injection orifice 15 of the nozzle 9 comprises, in addition to the obturator needle 16 sliding in the guide 17, a coaxial rod 19 placed above the needle 16 and sliding in a ring 21 screwed in the upper part of the distribution plate 2. The needle 16 passes through the material transfer tube 18 and is partially engaged, in its upper part, in the distribution plate 2. It terminates in a head 16a moving in a housing 22 made in the distribution plate 2. In this housing there also projects the lower part of the rod 19 of the obturator assembly, which terminates in a head 19a of larger diameter than that of the head 16a of the needle 16. The two heads 16a and 19a are assembled together by a ring 23 which is crimped on the head 19a of large diameter, leaving a minimum axial clearance for the head 16a, of smaller diameter, of the needle 16, whilst allowing it the radial, rotary or planetary displacements necessary for its alignment. To this end, the ring 23 presents in its lower part an inner flange 23a defining a central orifice of a sufficiently large diameter to allow a radial movement of the obturator needle 16.

The bore of the ring 21 in which slides the rod 19 of the obturator assembly communicates, by transverse conduits 24, with a conduit 25 pierced in the distribution plate 2 and serving for the evacuation of the residual leakages of plastics material. These residual leakages are advantageous to a certain extent in that they allow the interposition of a microfilm of plastics material acting as lubricant in the bore of the guide ring 21.

In its upper end part, the rod 19 of the obturator assembly opens in a housing 26 made in the upper plate 1 and adapted to receive a member for returning the obturator, such as a spring or a pneumatic or hydraulic jack. In the bottom of the housing, the rod 19 is in abutment beneath a plug 27 made of a material which is a poor conductor of heat, for example titanium alloy. As the device for returning the obturator needle 16 is mounted in the plate 1 which is cooled, this return device, in the case of it comprising a spring, does not undergo any thermal alteration and its yield remains identical. If this device employs a pneumatic or hydraulic jack, it requires only seals made of standard quality rubber and it is not necessary to use special high temperature seals.

The injection device according to the invention has a high heat yield by using either electrical heating cartridges or the circulation of a heat-carrying fluid in conduits 7. In fact, the hot distribution plate is wedged in space by shims 11, 12 made of titanium alloy, of poor heat conductivity, without contact by the edges. In addition, to avoid supplementary losses by radiation or ventilation, this hot distribution plate is totally insulated by means of a heat insulator 28 such as glass wool, filling the space left free between the distribution plate 2 on the one hand and the plate 1, the outer frame 4 and the impression plate 3 on the other hand. According to the above description, it is seen that the injection threshold 13 is obturated by the needle 16 which is perfectly guided, this avoiding any ovalisation causing an increase in the diameter and an alteration in the appearance of the injected piece. In addition, this needle is not subjected to any flexion to the "floating" assembly allowing the radial displacements of the various elements to be absorbed.

Due to the excellent heat conductivity and the perfect transmission of heat between the nozzle 9 and the impression insert 5, there is no risk of the injection threshold 13 clogging and a perfect flow of the plastics material to the center of the impression is obtained.

What I claim is:

1. A device for injecting plastics material in a mould having a plurality of impressions, comprising:
    a distribution plate pierced with channels for the inlet of the plastics material to be injected and provided with heating means;
    an impression plate comprising a plurality of impression inserts into which the plastics material is to be injected;
    injection nozzles disposed between said distribution plate and the various impression inserts and being free of any connection with said distribution plate, each presenting an injection orifice opening into the impression insert associated therewith and being obturated by an obturator needle mounted to slide axially in the nozzle;
    a material transfer tube ensuring the connection between the distribution plate and each nozzle and engaged in two cavities made respectively in the distribution plate and in the nozzle, opposite each other, the first communicating with a channel for the inlet of the plastics material from said distribution plate and the second with the injection orifice of the nozzle, this transfer tube being in tight contact with the lateral walls of the two cavities via two respective spherical sectors provided on its side surface to perform a sealing function even when said distribution plate and said nozzles are relatively displaced; and
    said obturator needle projects into a coaxial housing provided in the distribution plate, it terminates in a head of larger diameter and is upwardly extended by a coaxial rod terminating, at its lower end, in a head of larger diameter disposed in the housing, said obturator needle and said rod being in contact with each other via their respective heads of different diameters and being assembled together by a ring crimped on the head of large diameter, leaving a minimum axial clearance for the head of smaller diameter but allowing it the radial, rotary or planetary displacements necessary for its alignment.

2. An injection device according to claim 1, wherein the head of the rod of the obturator assembly has a larger diameter than that of the head of the obturator needle and the ring, crimped on the head of large diameter of the rod, terminates, in its lower part, in a flange defining a central orifice of a sufficiently large diameter to allow a radial movement of the obturator needle.

3. An injection device according to claim 1 or 2, wherein the rod of the obturator assembly is mounted to slide axially in a bore of a ring screwed in the distribution plate, this bore communicating, via conduits made in the ring, with a conduit pierced in the distribution plate and serving to evacuate the residual leakages of plastics material.

4. An injection device according to claim 1, including a peripheral outer frame, and wherein the space between said distribution plate on the one hand and said upper plate, said lower impression plate, and said peripheral frame serving to tighten all these elements, on the other hand, is filled with a heat insulator.

5. An injection device according to claim 4, wherein said heat insulator is glass wool.

6. An injection device according to claim 1 or 2, wherein the rod of the obturator assembly opens out, at its upper end, in a housing made in the upper plate and receiving the device for returning the obturator assembly, with jack means, the rod being in contact under a plug made of a material which is a poor heat conductor.

7. An injection device according to claim 1 or 2, wherein the distribution plate is wedged in space by means of shims made of a titanium alloy material which is a poor heat conductor, one of these rings being disposed between each nozzle and an impression insert of the impression plate, whilst the other ring is disposed between the distribution plate and the upper plate at the location of each obturator assembly, surrounding the upper part of said latter.

* * * * *